(12) United States Patent
Lee et al.

(10) Patent No.: US 12,072,563 B1
(45) Date of Patent: Aug. 27, 2024

(54) DISPLAY PANEL INCLUDING HEATING FILM LAYER

(71) Applicant: Dell Products L.P., Round Rock, TX (US)

(72) Inventors: Bongjun Lee, Singapore (SG); Hyunseok Ko, Singapore (SG)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 18/327,190

(22) Filed: Jun. 1, 2023

(51) Int. Cl.
*G02F 1/1333* (2006.01)

(52) U.S. Cl.
CPC .. *G02F 1/133314* (2021.01); *G02F 1/133382* (2013.01)

(58) Field of Classification Search
CPC ...................... G02F 1/133314; G02F 1/133382
See application file for complete search history.

(56) References Cited

U.S. PATENT DOCUMENTS

2012/0154706 A1\* 6/2012 Cho ..................... G09G 3/3648
349/72

FOREIGN PATENT DOCUMENTS

| CN | 109212807 A | \* | 1/2019 |
| JP | 03033720 A | \* | 2/1991 |

\* cited by examiner

*Primary Examiner* — Mariceli Santiago
(74) *Attorney, Agent, or Firm* — McDermott Will & Emery LLP (57) ABSTRACT

A display panel including: a back cover; a liquid crystal display (LCD) layer; a plurality of optical layers positioned between the back cover and the LCD layer; a heating film layer; one or more temperature sensors configured to detect a temperature of the display panel; and a heating film layer configured to adjust a temperature of the display panel based on the detected temperature of the display panel.

8 Claims, 7 Drawing Sheets

DISPLAY PANEL INCLUDING HEATING FILM LAYER

BACKGROUND

Field of the Disclosure

The disclosure relates generally to a display panel including a heating film layer.

Description of the Related Art

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

SUMMARY

Innovative aspects of the subject matter described in this specification may be embodied in a display panel including: a back cover; a liquid crystal display (LCD) layer; a plurality of optical layers positioned between the back cover and the LCD layer; a heating film layer; one or more temperature sensors configured to detect a temperature of the display panel; and a heating film layer configured to adjust a temperature of the display panel based on the detected temperature of the display panel.

Other embodiments of these aspects include corresponding systems, apparatus, and computer programs, configured to perform the actions of the methods, encoded on computer storage devices.

These and other embodiments may each optionally include one or more of the following features. For instance, the heating film layer is further configured to adjust the temperature of the LCD layer. The heating film layer is further configured to adjust the temperature of liquid crystals (LC) of the LCD layer. The heating film layer is positioned between the LCD layer and the plurality of optical layers. The LCD layer has a top surface and a bottom surface opposite to the top surface, the heating film layer is adhered to the top surface of the LCD layer. A density pattern of the heating film layer varies across the display panel. The density pattern of the heating film is based on a temperature gradient of the display panel. The heating film layer is transparent. The heating film layer is further configured to adjust the temperature of the display panel substantially consistently across the display panel. The heating film layer is further configured to adjust the temperature of the display panel to approximately between 50 degrees Celsius and 60 degrees Celsius.

The details of one or more embodiments of the subject matter described in this specification are set forth in the accompanying drawings and the description below. Other potential features, aspects, and advantages of the subject matter will become apparent from the description, the drawings, and the claims.

DESCRIPTION OF PARTICULAR EMBODIMENT(S)

This disclosure discusses a display panel including a heating film layer. In short, a particular response time (RT) of the display panel is desired (e.g., a user requested RT—a "fast" RT). To obtain such a RT, a temperature of the display panel can be increased to decrease a viscosity of liquid crystals of a liquid crystal display layer of the display panel. To increase the temperature of the display panel, a heating film layer can generate heat to obtain such temperature of the display panel, described further herein.

Specifically, this disclosure discusses a display panel including a back cover; a liquid crystal display (LCD) layer; a plurality of optical layers positioned between the back cover and the LCD layer; a heating film layer; one or more temperature sensors configured to detect a temperature of the display panel; and a heating film layer configured to adjust a temperature of the display panel based on the detected temperature of the display panel.

In the following description, details are set forth by way of example to facilitate discussion of the disclosed subject matter. It should be apparent to a person of ordinary skill in the field, however, that the disclosed embodiments are exemplary and not exhaustive of all possible embodiments.

For the purposes of this disclosure, an information handling system may include an instrumentality or aggregate of instrumentalities operable to compute, classify, process, transmit, receive, retrieve, originate, switch, store, display, manifest, detect, record, reproduce, handle, or utilize various forms of information, intelligence, or data for business, scientific, control, entertainment, or other purposes. For example, an information handling system may be a personal computer, a PDA, a consumer electronic device, a network storage device, or another suitable device and may vary in size, shape, performance, functionality, and price. The information handling system may include memory, one or more processing resources such as a central processing unit (CPU) or hardware or software control logic. Additional components of the information handling system may include one or more storage devices, one or more communications ports for communicating with external devices as well as various input and output (I/O) devices, such as a keyboard, a mouse, and a video display. The information handling system may also include one or more buses operable to transmit communication between the various hardware components.

For the purposes of this disclosure, computer-readable media may include an instrumentality or aggregation of instrumentalities that may retain data and/or instructions for a period of time. Computer-readable media may include, without limitation, storage media such as a direct access storage device (e.g., a hard disk drive or floppy disk), a sequential access storage device (e.g., a tape disk drive), compact disk, CD-ROM, DVD, random access memory (RAM), read-only memory (ROM), electrically erasable programmable read-only memory (EEPROM), and/or flash memory (SSD); as well as communications media such wires, optical fibers, microwaves, radio waves, and other electromagnetic and/or optical carriers; and/or any combination of the foregoing.

Particular embodiments are best understood by reference to FIGS. 1-5 wherein like numbers are used to indicate like and corresponding parts.

Figure 1:
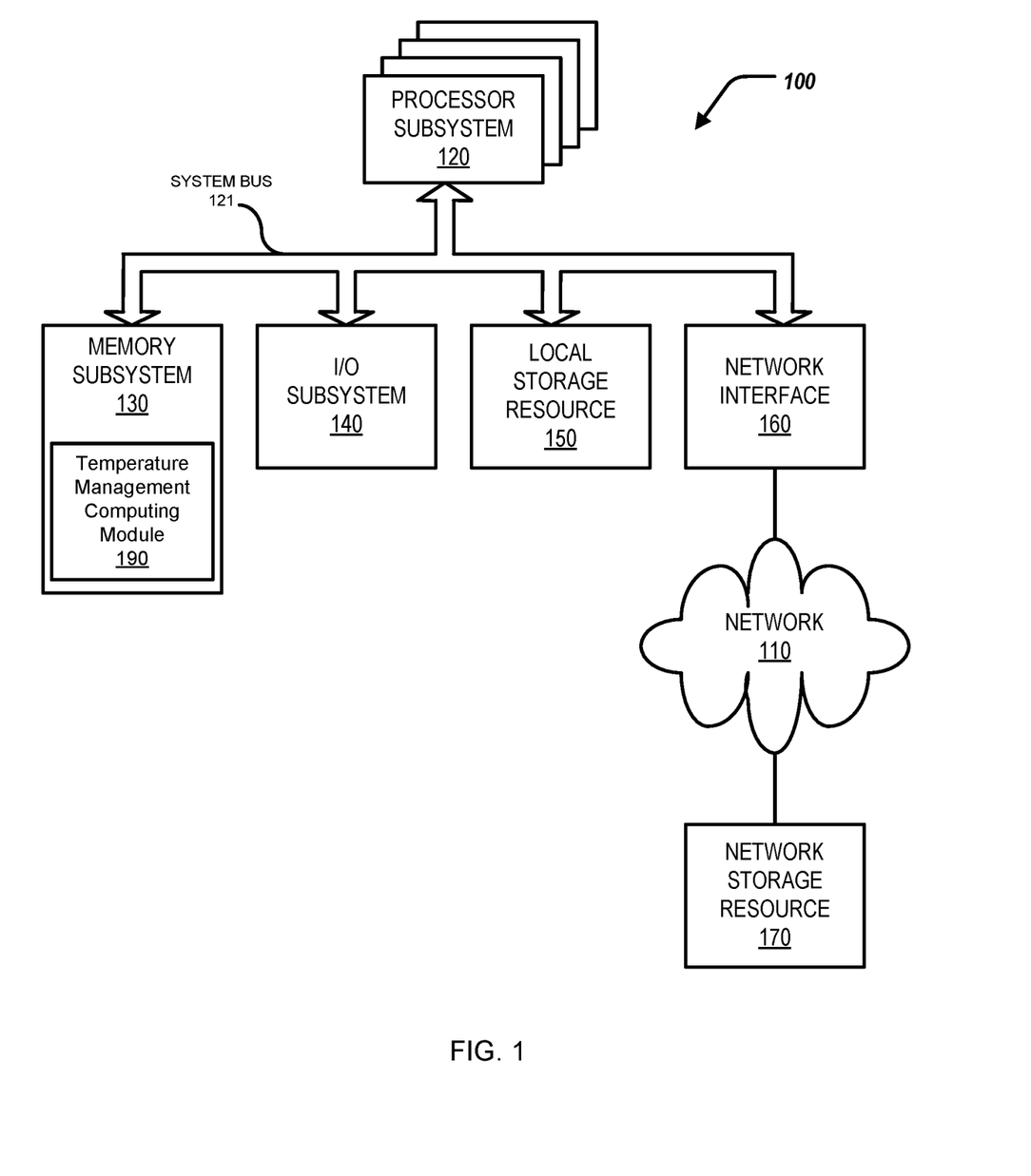
FIG. 1 is a block diagram of selected elements of an embodiment of an information handling system.

Turning now to the drawings, FIG. 1 illustrates a block diagram depicting selected elements of an information handling system 100 in accordance with some embodiments of the present disclosure. In various embodiments, information handling system 100 may represent different types of portable information handling systems, such as, display devices, head mounted displays, head mount display systems, smart phones, tablet computers, notebook computers, media players, digital cameras, 2-in-1 tablet-laptop combination computers, and wireless organizers, or other types of portable information handling systems. In one or more embodiments, information handling system 100 may also represent other types of information handling systems, including desktop computers, server systems, controllers, and microcontroller units, among other types of information handling systems. Components of information handling system 100 may include, but are not limited to, a processor subsystem 120, which may comprise one or more processors, and system bus 121 that communicatively couples various system components to processor subsystem 120 including, for example, a memory subsystem 130, an I/O subsystem 140, a local storage resource 150, and a network interface 160. System bus 121 may represent a variety of suitable types of bus structures, e.g., a memory bus, a peripheral bus, or a local bus using various bus architectures in selected embodiments. For example, such architectures may include, but are not limited to, Micro Channel Architecture (MCA) bus, Industry Standard Architecture (ISA) bus, Enhanced ISA (EISA) bus, Peripheral Component Interconnect (PCI) bus, PCI-Express bus, HyperTransport (HT) bus, and Video Electronics Standards Association (VESA) local bus.

As depicted in FIG. 1, processor subsystem 120 may comprise a system, device, or apparatus operable to interpret and/or execute program instructions and/or process data, and may include a microprocessor, microcontroller, digital signal processor (DSP), application specific integrated circuit (ASIC), or another digital or analog circuitry configured to interpret and/or execute program instructions and/or process data. In some embodiments, processor subsystem 120 may interpret and/or execute program instructions and/or process data stored locally (e.g., in memory subsystem 130 and/or another component of information handling system). In the same or alternative embodiments, processor subsystem 120 may interpret and/or execute program instructions and/or process data stored remotely (e.g., in network storage resource 170).

Also in FIG. 1, memory subsystem 130 may comprise a system, device, or apparatus operable to retain and/or retrieve program instructions and/or data for a period of time (e.g., computer-readable media). Memory subsystem 130 may comprise random access memory (RAM), electrically erasable programmable read-only memory (EEPROM), a PCMCIA card, flash memory, magnetic storage, opto-magnetic storage, and/or a suitable selection and/or array of volatile or non-volatile memory that retains data after power to its associated information handling system, such as system 100, is powered down.

In information handling system 100, I/O subsystem 140 may comprise a system, device, or apparatus generally operable to receive and/or transmit data to/from/within information handling system 100. I/O subsystem 140 may represent, for example, a variety of communication interfaces, graphics interfaces, video interfaces, user input interfaces, and/or peripheral interfaces. In various embodiments, I/O subsystem 140 may be used to support various peripheral devices, such as a touch panel, a display adapter, a keyboard, an accelerometer, a touch pad, a gyroscope, an IR sensor, a microphone, a sensor, or a camera, or another type of peripheral device.

Local storage resource 150 may comprise computer-readable media (e.g., hard disk drive, floppy disk drive, CD-ROM, and/or other type of rotating storage media, flash memory, EEPROM, and/or another type of solid state storage media) and may be generally operable to store instructions and/or data. Likewise, the network storage resource may comprise computer-readable media (e.g., hard disk drive, floppy disk drive, CD-ROM, and/or other type of rotating storage media, flash memory, EEPROM, and/or other type of solid state storage media) and may be generally operable to store instructions and/or data.

In FIG. 1, network interface 160 may be a suitable system, apparatus, or device operable to serve as an interface between information handling system 100 and a network 110. Network interface 160 may enable information handling system 100 to communicate over network 110 using a suitable transmission protocol and/or standard, including, but not limited to, transmission protocols and/or standards enumerated below with respect to the discussion of network 110. In some embodiments, network interface 160 may be communicatively coupled via network 110 to a network storage resource 170. Network 110 may be a public network or a private (e.g. corporate) network. The network may be implemented as, or may be a part of, a storage area network (SAN), personal area network (PAN), local area network (LAN), a metropolitan area network (MAN), a wide area network (WAN), a wireless local area network (WLAN), a virtual private network (VPN), an intranet, the Internet or another appropriate architecture or system that facilitates the communication of signals, data and/or messages (generally referred to as data). Network interface 160 may enable wired and/or wireless communications (e.g., NFC or Bluetooth) to and/or from information handling system 100.

In particular embodiments, network 110 may include one or more routers for routing data between client information handling systems 100 and server information handling systems 100. A device (e.g., a client information handling system 100 or a server information handling system 100) on network 110 may be addressed by a corresponding network address including, for example, an Internet protocol (IP)

address, an Internet name, a Windows Internet name service (WINS) name, a domain name or other system name. In particular embodiments, network 110 may include one or more logical groupings of network devices such as, for example, one or more sites (e.g. customer sites) or subnets. As an example, a corporate network may include potentially thousands of offices or branches, each with its own subnet (or multiple subnets) having many devices. One or more client information handling systems 100 may communicate with one or more server information handling systems 100 via any suitable connection including, for example, a modem connection, a LAN connection including the Ethernet or a broadband WAN connection including DSL, Cable, Ti, T3, Fiber Optics, Wi-Fi, or a mobile network connection including GSM, GPRS, 3G, or WiMax.

Network 110 may transmit data using a desired storage and/or communication protocol, including, but not limited to, Fibre Channel, Frame Relay, Asynchronous Transfer Mode (ATM), Internet protocol (IP), other packet-based protocol, small computer system interface (SCSI), Internet SCSI (iSCSI), Serial Attached SCSI (SAS) or another transport that operates with the SCSI protocol, advanced technology attachment (ATA), serial ATA (SATA), advanced technology attachment packet interface (ATAPI), serial storage architecture (SSA), integrated drive electronics (IDE), and/or any combination thereof. Network 110 and its various components may be implemented using hardware, software, or any combination thereof.

The information handling system 100 can also include a temperature management computing module 190. The temperature management computing module 190 can be included by the memory subsystem 130. The temperature management computing module 190 can include a computer-executable program (software). The temperature management computing module 190 can be executed by the processor subsystem 120.

Figure 2:
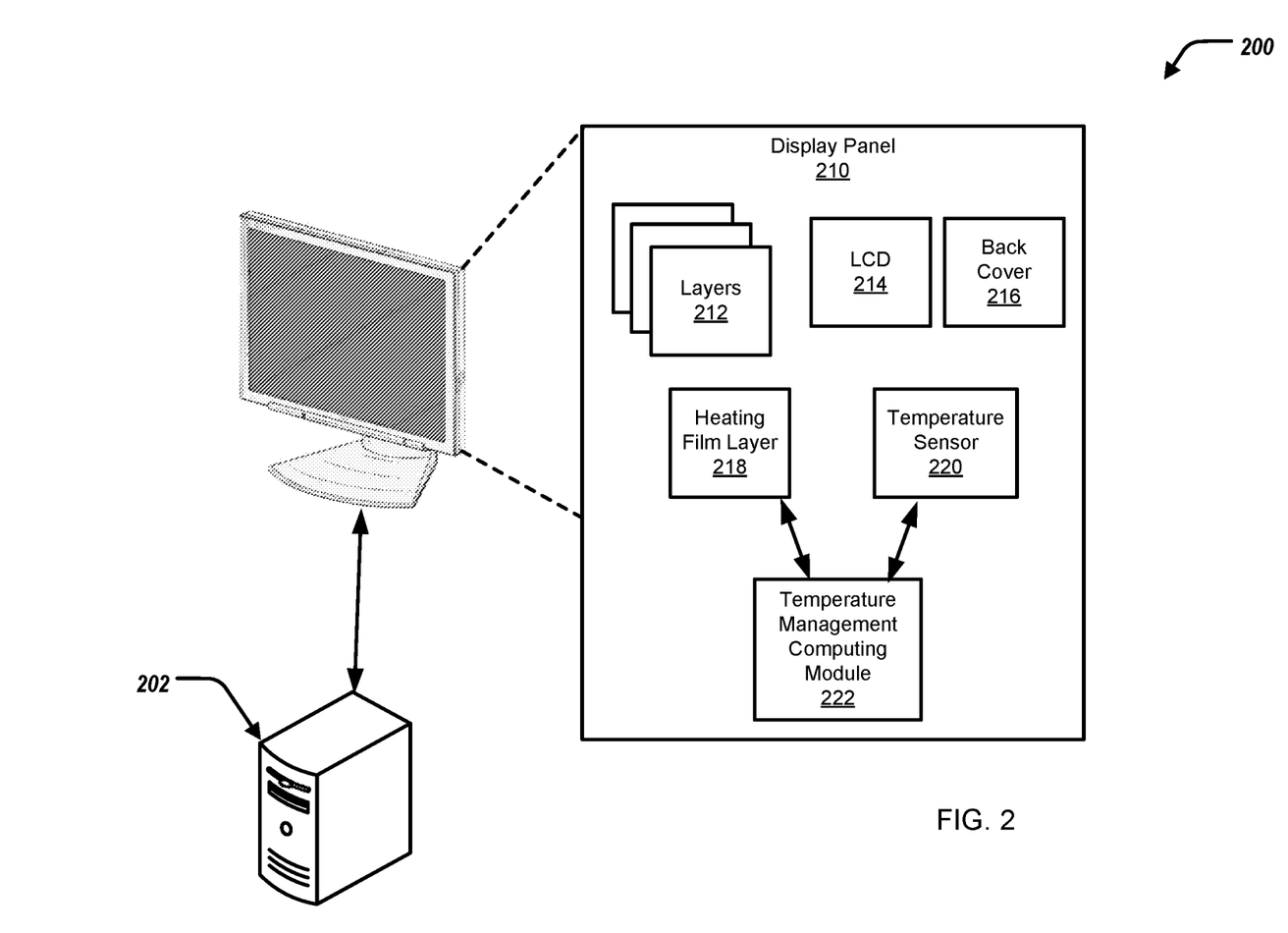
FIG. 2 illustrates a block diagram of an information handling system and a display panel.

Turning to FIG. 2, FIG. 2 illustrates an environment 200 including an information handling system 202 and a display panel 210. The display panel 210 can include layers 212, a liquid crystal display (LCD) layer 214, a back cover 216, a heating film layer 218, temperature sensors 220 (or a temperature sensor 220), and a temperature management computing module 222. In some examples, the information handling system 202 is similar to, or includes, the information handling system 100 of FIG. 1.

In some examples, the display panel 210 can include one or more components similar to the components of the information handling system 100 of FIG. 1, such as the processor subsystem 120, the system bus 121, the memory subsystem 130, the I/O subsystem 140, the local storage resource 150, and the network interface 160.

In some examples, the temperature management computing module 222 is the same, or substantially the same, as the temperature management computing module 190 of FIG. 1.

The information handling system 202 can be in coupled to and in communication with the display panel 210.

The temperature management computing module 222 can be in communication with the heating film layer 218 and the temperature sensors 220.

The temperature sensors 220 are configured to detect a temperature of the display panel 210, described further herein. The temperature sensors 220 can be coupled to the back cover 216.

In short, a particular response time (RT) of the display panel 210 is desired (e.g., a user requested RT—a "fast" RT). To obtain such a RT, a temperature of the display panel 210 can be increased to decrease a viscosity of liquid crystals of a liquid crystal display layer of the display panel 210 to decrease the RT of the display panel 210. To increase the temperature of the display panel 210, the heating film layer 218 can generate heat to obtain such temperature of the display panel 210, described further herein.

Figure 3A:
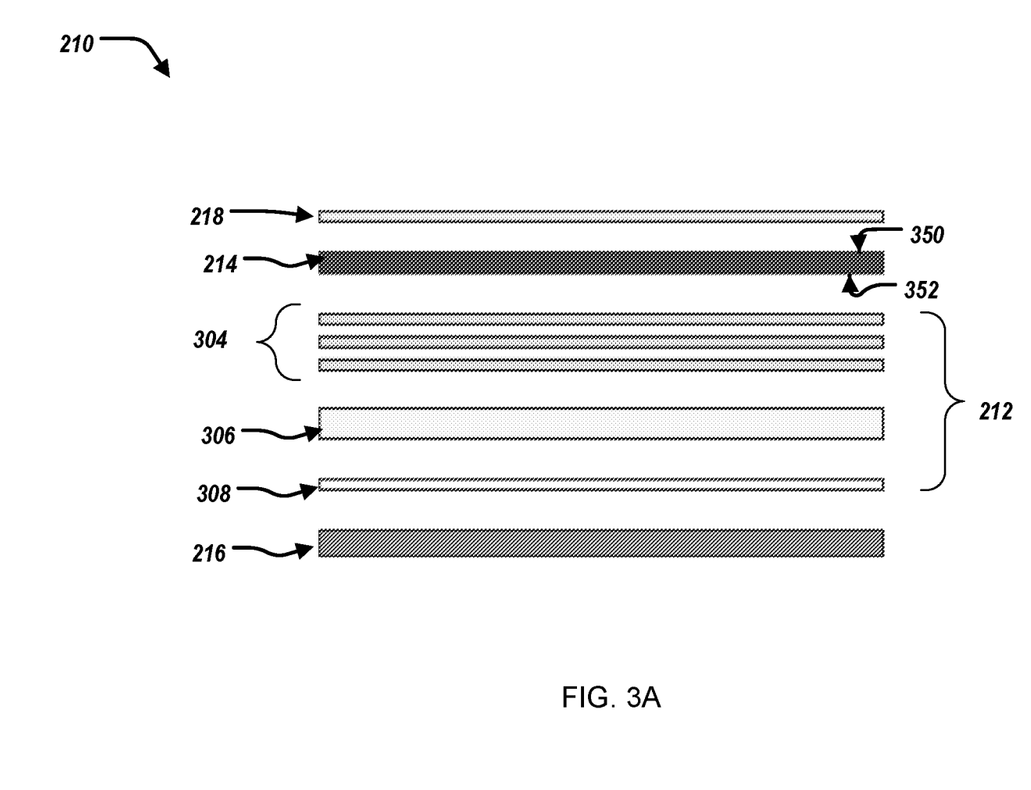
FIG. 3A illustrates an exploded side view of the display panel, in a first implementation.

FIG. 3A illustrates an exploded side view of the display panel 210, in a first implementation. The display panel 210 can include the LCD layer 214 and the back cover 216. The LCD layer 214 can be a front cover, and include glass. The LCD layer 214 can include a top surface 350 and a bottom surface 352. The bottom surface 352 can be opposite to the top surface 350.

The display panel 210 can further include (optical) layers 212. The layers 212 can include optical film layers 304 (prism/diffuser), a light guide plate (LGP) 306, and a reflector 308. The display panel 210 can further include the heating film layer 218. In some examples, the heating film layer 218 can be transparent.

The layers 212 can be positioned between the back cover 216 and the LCD layer 214.

In some examples, the heating film layer 218 can be coupled to the top surface 350 of the LCD layer 214. That is, the heating film layer 218 is adhered (bonded) to the top surface 350 of the LCD layer 214. For example, the heating film layer 218 is adhered to the top surface 350 of the LCD layer 214 with a pressure-sensitive adhesive (PSA).

Referring to FIGS. 2 and 3A, to that end, the heating film layer 218 is configured to adjust a temperature of the display panel 212 based on a detected temperature of the display panel 212. Specifically, the sensors 220 detect a (current) temperature of the display panel 212. The heating film layer 218 adjusts the magnitude of the temperature of the display panel 212 based on a desired performance level of the display panel 212. For example, an increased temperature of the display panel 212 can result in a faster response time (RT) of the display panel 212.

Specifically, the heating film layer 218 is configured to adjust the temperature of the LCD layer 214 of the display panel 210, and in particular, the temperature of liquid crystals (LC) of the LCD layer 214 of the display panel 210. As the temperature of the LC increases, a viscosity of the LC decreases. A decrease of viscosity of the LC of the LCD layer 214 results in a faster response time (RT) of the display panel 210 (decreased RT of the display panel 210). For example, the heating film layer 218 can increase the temperature of the display panel 210 (and thus the temperature of the LC of the LCD layer 214 and a decrease in viscosity of the LC of the LCD layer 218) to between 50 degrees Celsius and 60 degrees Celsius. An increase of the temperature of the display panel 210 to between 50 degrees Celsius and 60 degrees Celsius can reduce the RT of the display panel 210 (and the LCD layer 214) by half (as compared to a temperature of the display panel 210 of 25 degrees Celsius).

Figure 3B:
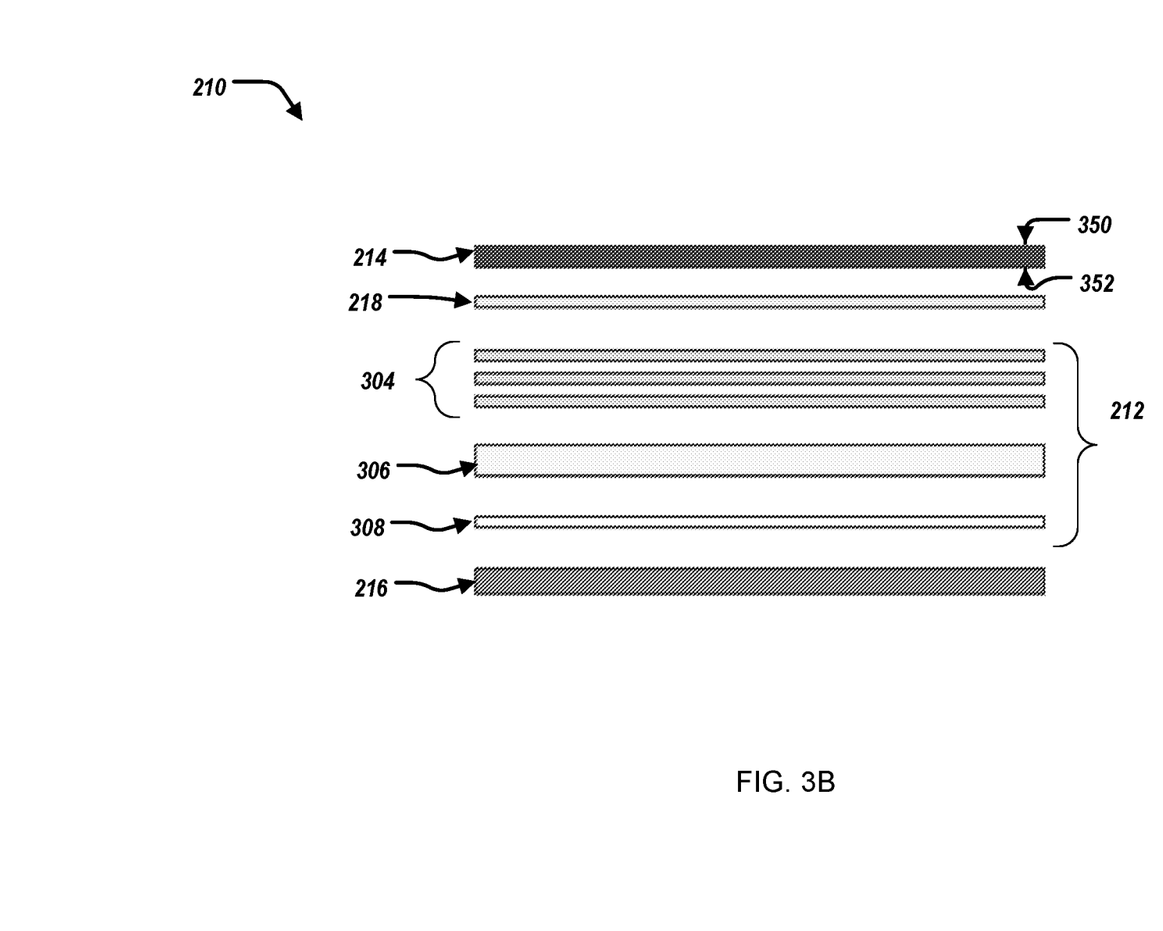
FIG. 3B illustrates an exploded side view of the display panel, in a second implementation.

FIG. 3B illustrates an exploded side view of the display panel 210, in a second implementation. In some examples, the heating film layer 218 is positioned between the LCD layer 214 and the layers 212. For example, the heating film layer 218 is positioned between the LCD layer 214 and the optical film layers 304.

Referring to FIGS. 2, 3A, 3B, the heating film layer 218 is configured to adjust the temperature of the display panel 210 substantially consistently across the display panel 210. That is, the heating film layer 218 is configured to adjust the temperature of the display panel 210 across the display panel 210 such that a variation in temperature of the display panel 210 across the display panel 210 is less than a threshold.

In some example, the heating film layer 218 is configured to adjust the temperature of the display panel 210 to approximately between 50 degrees Celsius and 60 degrees Celsius.

Figure 4A:
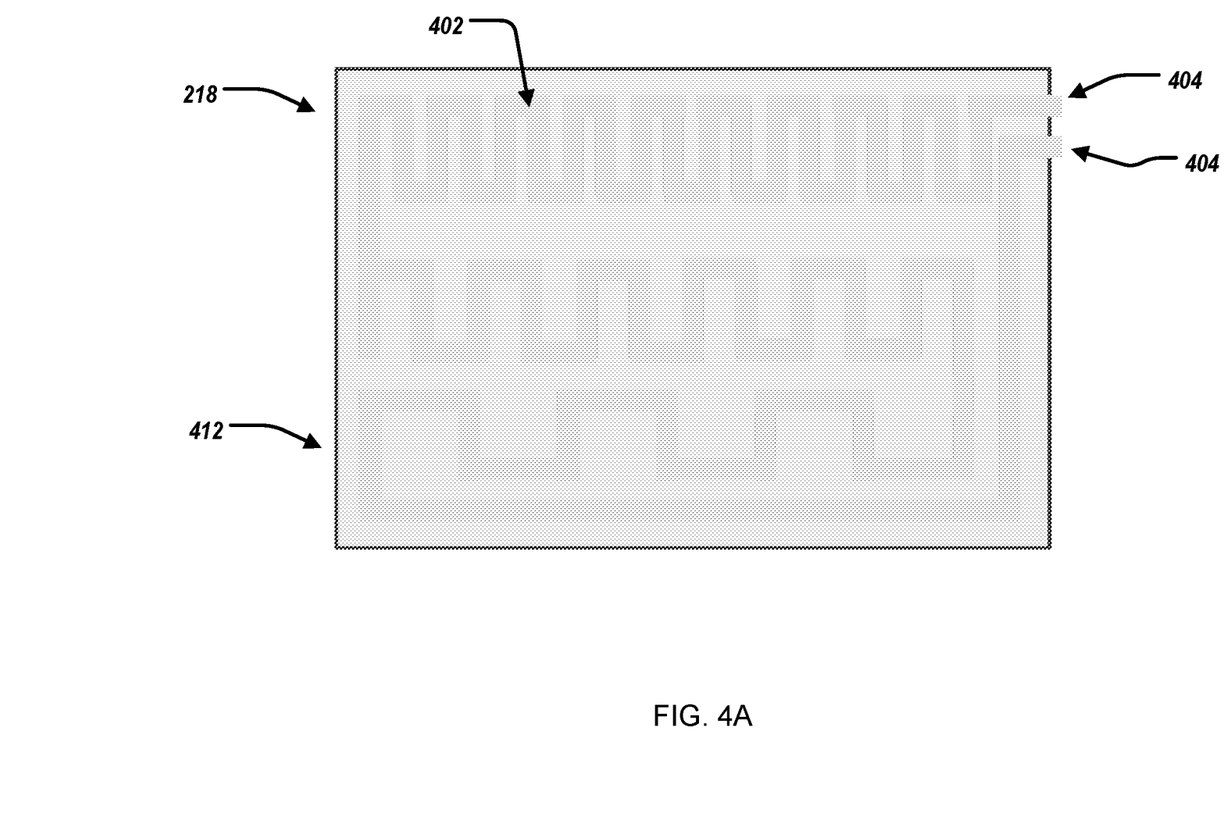
FIG. 4A illustrates a top down view of a heating film layer of the display panel, in a first implementation.

FIG. 4A illustrates a top down view of the heating film layer 218, in a first implementation. The heating film layer 218 can include a heating film element 402. The heating film element 402 can include terminals 404 connected to a power source (not shown). The power source can provide power to the heating film element 402 via the terminals 404 such that the heating film layer 218 can provide (radiate) heat to increase the temperature of the display panel 210. In some examples, a density pattern of the heating film layer 218 (and the heating film element 402) can vary across the display panel 210. For example, the density of the heating film element 402 can be greater at a first end 410 of the heating film layer 218 than at a second end 412 of the heating film layer 218.

The density of the heating film element 402 can be based on detected temperature variations of the display panel 210 (e.g., by the sensors 220) across the display panel 210. That is, the detected temperature of the display panel 210 can vary across the display panel 210—a temperature gradient of the display panel 210. Thus, to increase the temperature of the display panel 210 to a substantially consistent temperature across the display panel 210, differing temperature adjustments may be needed across the display panel 210 in view of the temperature gradient of the display panel 210. To that end, the density of the heating film element 402 can be based on the detected temperature gradient of the display panel 210, and the density of the heating film element 402 can compensate for such temperature gradient.

In some examples, the density of the pattern of the heating film layer 218 (and the heating film element 402) can be substantially constant across the display panel 212.

Figure 4B:
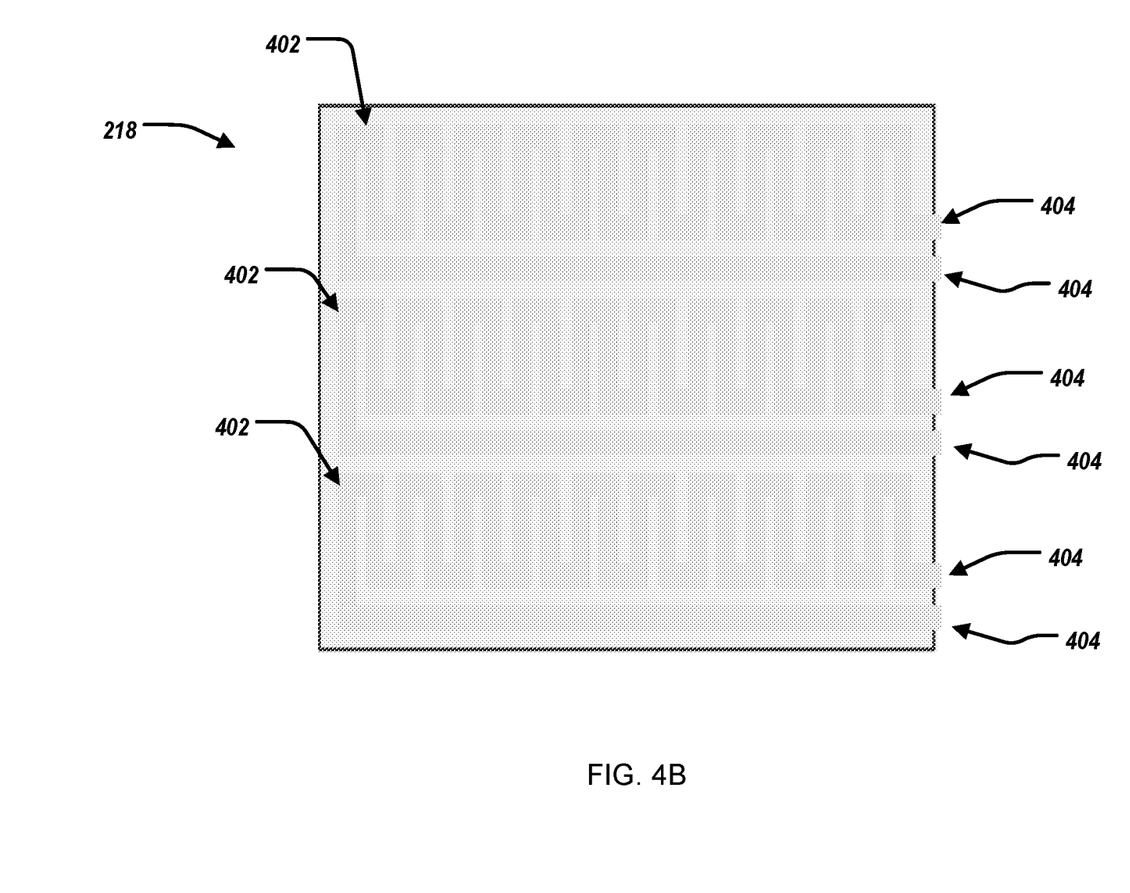
FIG. 4B illustrates a top down view of a heating film layer of the display panel, in a second implementation.

FIG. 4B illustrates a top down view of the heating film layer 218, in a second implementation. The heating film layer 218 can include multiple heating film elements 402. Each of the heating film elements 402 can include respective terminals 404 connected to a power source (not shown). In some examples, the power source can provide power to each of the heating film elements 402 via respective terminals 404 such that each of the heating film layer 218 can provide (radiate) heat to increase the temperature of the display panel 210. In some examples, the power source can provide power to a subset of the heating film elements 402 via respective terminals 404 such that the subset of the heating film layers 218 can provide (radiate) heat to increase the temperature of the display panel 210.

Figure 5:
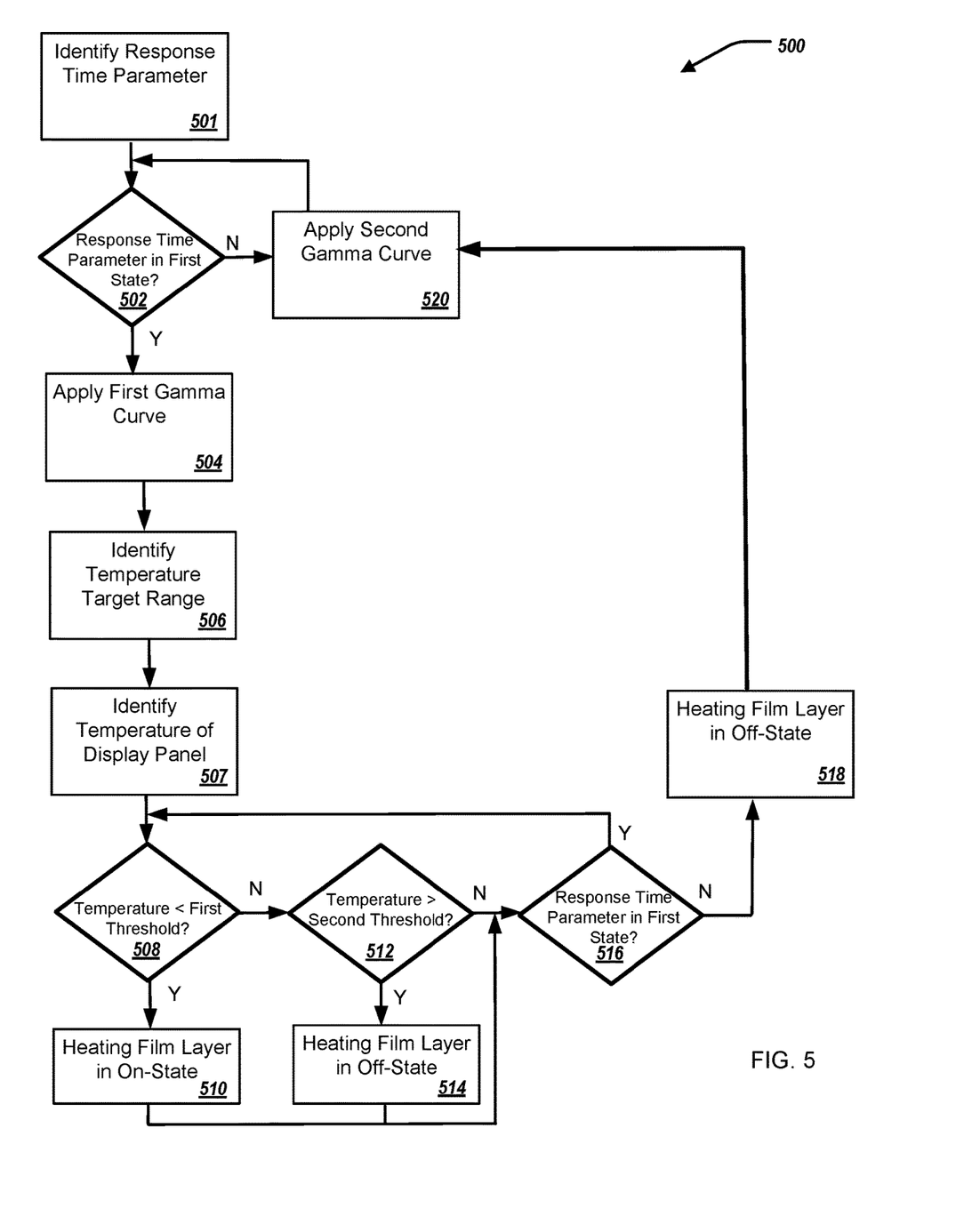
FIG. 5 illustrates a method for managing a temperature of the display panel.

FIG. 5 illustrates a flowchart depicting selected elements of an embodiment of a method 500 for managing a temperature of the display panel 210. The method 500 may be performed by the information handling system 100, the information handling system 202, the display panel 210, the heating film layer 218, the temperature sensors 220, and/or the temperature management computing module 222, and with reference to FIGS. 1-4. It is noted that certain operations described in method 500 may be optional or may be rearranged in different embodiments.

The temperature management computing module 222 identifies a response time parameter associated with the display panel 210, at 501. For example, the response time parameter can include "fast," "super-fast," or "extreme" in terms of response time of the display panel 210. For example, the "extreme" mode can indicate a fastest possible response time of the display panel 210. The temperature management computing module 222 can determine whether the response time parameter is in a first state, at 502. For example, the temperature management computing module 222 can determine whether the response time parameter is in the first state to indicate a fastest possible response time of the display panel 210. For example, the temperature management computing module 222 can determine whether the response time parameter is in in the "extreme" mode.

The temperature management computing module 222, in response to determining that the response time parameter is in the first state (at 502), applies a first gamma curve associated with the first state of the response time parameter, at 504. The gamma curve can indicate an encoding, or bandwidth, associated with images displayed by the display panel 210.

The temperature management computing module 222 identifies a temperature target range associated with the first state of the response time parameter, at 506. That is, the temperature management computing module 222 identifies a first threshold and a second threshold of the temperature target range that is associated with the first state of the response time parameter. For example, the first threshold can be 50 degrees Celsius and the second threshold can be 60 degrees Celsius (temperature target range between 50 degrees Celsius and 60 degrees Celsius).

The temperature management computing module 222 identifies a temperature associated with the display panel 210, at 507. That is, the sensors 220 identify the first temperature of the display panel 210 (e.g., at one or more locations of the display panel 210). The sensors 220 can provide the temperature of the display panel 210 to the temperature management computing module 222 dynamically, or in response to a request.

The temperature management computing module 222 compares the temperature associated with the display panel 210 with the first threshold of the target temperature range, at 508. In some examples, the temperature management computing module 222 determines, based on such comparing (at 508), that the temperature associated with the display panel 210 is less than the first threshold of the target temperature range. The temperature management computing module 222, in response to determining that the temperature associated with the display panel 210 is less than the first threshold of the target temperature range, adjusts the heating film layer 218 to an on-state, at 510. Specifically, the temperature management computing module 222 adjusts the heating film layer 218 to the on-state such that the heating film layer 218 increases the temperature associated with the display panel 210. That is, the heating film layer 218 generates heat and radiates such heat through the display panel 210 to increase the temperature associated with the display panel 210. Specifically, the heating film layer 218 generates heat and radiates such heat through the display panel 210 to increase the temperature of the LCD layer 214, and the liquid crystals (LC) of the LCD layer 214. In turn, the viscosity of the LC of the LCD layer 214 is decreased, resulting in a decreased response time (RT) of the LCD layer 214.

In some examples, the temperature management computing module 222 determines, based on such comparing (at 508), that the temperature associated with the display panel 210 is greater than the first threshold of the target temperature range. The temperature management computing module 222, in response to determining that the temperature associated with the display panel 210 is greater than the first threshold of the target temperature range, compares the temperature associated with the display panel 210 with the second threshold of the target temperature range, at 512.

In some examples, the temperature management computing module 222 determines, based on such comparing (at 512), that the temperature associated with the display panel 210 is greater than the second threshold of the target temperature range. The temperature management computing module 222, in response to determining that the temperature associated with the display panel 210 is greater than the second threshold of the target temperature range, adjusts the heating film layer 218 to an off-state, at 514. Specifically, the temperature management computing module 222 adjusts the heating film layer 218 to the off-state such that the heating film layer 218 ceases to increase the temperature associated with the display panel 210.

In some examples, the temperature management computing module 222 determines, based on such comparing (at 512), that the temperature associated with the display panel 210 is less than the second threshold of the target temperature range. The temperature management computing module 222, in response to determining that the temperature associated with the display panel 210 is less than the second threshold of the target temperature range, re-determines whether response time parameter is in the first state, at 516. For example, the temperature management computing module 222 can determine whether the response time parameter is in the first state to indicate a fastest possible response time of the display panel 210. For example, the temperature management computing module 222 can determine whether the response time parameter is in in the "extreme" mode.

In some examples, the temperature management computing module 222, in response to determining that the response time parameter is in the first state (at 516), returns to step 508.

In some examples, the temperature management computing module 222, in response to determining that the response time parameter is not in the first state (at 516), adjusts the heating film layer 218 to the off-state, at 518. Specifically, the temperature management computing module 222 adjusts the heating film layer 218 to the off-state such that the heating film layer 218 ceases to increase the temperature associated with the display panel 210. Further, the temperature management computing module 222, in response to determining that the response time parameter is not in the first state (at 516), applies a second gamma curve associated with a second state of the response time parameter, at 520. The gamma curve can indicate an encoding, or bandwidth, associated with images displayed by the display panel 210. The method then returns to step 502.

In some examples, after adjusting the heating film layer 218 to the on-state (at 510), the method returns to step 516.

In some examples, after adjusting the heating film layer 218 to the off-state (at 514), the method returns to step 516.

The above disclosed subject matter is to be considered illustrative, and not restrictive, and the appended claims are intended to cover all such modifications, enhancements, and other embodiments which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated other-wise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, features, functions, operations, or steps, any of these embodiments may include any combination or permutation of any of the components, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative.

What is claimed is:

1. A display panel including:
    a back cover;
    a liquid crystal display (LCD) layer;
    a plurality of optical layers positioned between the back cover and the LCD layer;
    one or more temperature sensors configured to detect a temperature of the display panel; and
    a heating film layer configured to adjust a temperature of the display panel based on the detected temperature of the display panel,
    wherein a density pattern of the heating film layer varies across the display panel based on a temperature gradient of the display panel such that a first density at a first end of the heating film layer is greater than a second density at a second end of the heating film layer to decrease a first viscosity of liquid crystal of the LCD layer at the first end greater than a decrease in a second viscosity of liquid crystal of the LCD layer at the second end.

2. The display panel of claim 1, wherein the heating film layer is further configured to adjust the temperature of the LCD layer.

3. The display panel of claim 1, wherein the heating film layer is further configured to adjust the temperature of liquid crystals (LC) of the LCD layer.

4. The display panel of claim 1, wherein the heating film layer is positioned between the LCD layer and the plurality of optical layers.

5. The display panel of claim 1, wherein LCD layer has a top surface and a bottom surface opposite to the top surface, the heating film layer is adhered to the top surface of the LCD layer.

6. The display panel of claim 1, wherein the heating film layer is transparent.

7. The display panel of claim 1, wherein the heating film layer is further configured to adjust the temperature of the display panel substantially consistently across the display panel.

8. The display panel of claim 1, wherein the heating film layer is further configured to adjust the temperature of the display panel to approximately between 50 degrees Celsius and 60 degrees Celsius.

\* \* \* \* \*